United States Patent
Raby et al.

(10) Patent No.: US 9,416,697 B2
(45) Date of Patent: Aug. 16, 2016

(54) ENGINE BEARING LUBRICATION BY EXTERNAL POSITIVE OIL PRESSURE DELIVERY

(71) Applicant: IMS SOLUTION, Watkinsville, GA (US)

(72) Inventors: Jacob Dean Raby, Cleveland, GA (US); Charles Lauren Navarro, Momence, IL (US)

(73) Assignee: IMS SOLUTION, Watkinsville, GA (US)

( * ) Notice: Subject to any disclaimer, the term of this patent is extended or adjusted under 35 U.S.C. 154(b) by 34 days.

(21) Appl. No.: 14/615,142

(22) Filed: Feb. 5, 2015

(65) Prior Publication Data

US 2015/0159526 A1    Jun. 11, 2015

Related U.S. Application Data

(63) Continuation of application No. 13/826,941, filed on Mar. 14, 2013, now Pat. No. 8,992,089.

(60) Provisional application No. 61/677,511, filed on Jul. 31, 2012.

(51) Int. Cl.

| | |
|---|---|
| *F16C 33/66* | (2006.01) |
| *F01M 11/03* | (2006.01) |
| *F16C 17/08* | (2006.01) |
| *B23P 15/00* | (2006.01) |
| *F16C 33/10* | (2006.01) |
| *F01M 7/00* | (2006.01) |
| *F16C 33/04* | (2006.01) |
| *F16C 35/02* | (2006.01) |

(52) U.S. Cl.
CPC .............. *F01M 11/03* (2013.01); *B23P 15/003* (2013.01); *F01M 7/00* (2013.01); *F16C 17/08* (2013.01); *F16C 33/04* (2013.01); *F16C 33/1045* (2013.01); *F16C 35/02* (2013.01); *F16C 2360/22* (2013.01); *Y10T 29/49231* (2015.01); *Y10T 29/49638* (2015.01)

(58) Field of Classification Search
CPC ...... F16C 17/08; F16C 33/04; F16C 33/1045; F16C 35/02; F01M 11/03; F01M 7/00
See application file for complete search history.

(56) References Cited

U.S. PATENT DOCUMENTS

| | | |
|---|---|---|
| 3,558,942 A | 1/1971 | Hill et al. |
| 3,636,795 A | 1/1972 | Maurice et al. |
| 4,429,924 A | 2/1984 | Franz et al. |
| 4,512,298 A | 4/1985 | Hayashi |
| 4,729,349 A | 3/1988 | Sonoda |

(Continued)

OTHER PUBLICATIONS

Office Action in U.S. Appl. No. 13/826,941, mailed on Oct. 7, 2014, 11 pages (pp. 1-11 in pdf).

(Continued)

*Primary Examiner* — Thomas R. Hannon
(74) *Attorney, Agent, or Firm* — Mitch Harris, Atty at Law, LLC; Andrew M. Harris

(57) ABSTRACT

A system including a lubrication delivery tube and a bearing for an engine provides high reliability through an externally-supplied lubrication. The system may be supplied as a kit including a lubrication delivery tube and an oil filter adapter having a port for supplying the external lubrication to a mounting flange of the bearing.

18 Claims, 6 Drawing Sheets

(56) References Cited

U.S. PATENT DOCUMENTS

| | | |
|---|---|---|
| 4,777,842 A | 10/1988 | Yamada |
| 4,805,565 A | 2/1989 | Sato et al. |
| 4,840,149 A | 6/1989 | Fujita |
| 4,957,079 A | 9/1990 | Nakatani et al. |
| 5,066,146 A | 11/1991 | McDonner |
| 5,567,306 A | 10/1996 | DeWachter |
| 5,702,321 A | 12/1997 | Bakowski et al. |
| 5,755,194 A | 5/1998 | Moorman et al. |
| 5,979,392 A | 11/1999 | Moorman et al. |
| 5,988,129 A | 11/1999 | Prior et al. |
| 6,032,635 A | 3/2000 | Moorman et al. |
| 6,308,621 B1 | 10/2001 | Douillard et al. |
| 6,640,933 B2 | 11/2003 | Henry et al. |
| 7,004,131 B1 | 2/2006 | Plenzler et al. |
| 7,533,739 B2 | 5/2009 | Cooley et al. |
| 7,552,782 B1 | 6/2009 | Sexton et al. |
| 7,559,695 B2 | 7/2009 | Sexton et al. |
| 7,604,073 B2 | 10/2009 | Cooley et al. |
| 7,694,773 B2 | 4/2010 | Janson et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 7,896,551 B2 | 3/2011 | Cooley et al. |
| 7,942,218 B2 | 5/2011 | Cooley et al. |
| 7,987,931 B2 | 8/2011 | Cooley et al. |
| 8,028,770 B2 | 10/2011 | Dick et al. |
| 8,061,452 B2 | 11/2011 | Cooley et al. |
| 8,069,933 B2 | 12/2011 | Sexton et al. |
| 8,210,285 B2 | 7/2012 | Cooley et al. |
| 8,210,747 B2 | 7/2012 | Cooley et al. |
| 8,220,999 B2 | 7/2012 | Cooley et al. |
| 2001/0015182 A1 | 8/2001 | Moorman et al. |
| 2003/0223664 A1 | 12/2003 | Harui |
| 2007/0177835 A1 | 8/2007 | Verhaegen |
| 2007/0277751 A1 | 12/2007 | Lin et al. |
| 2010/0218995 A1 | 9/2010 | Sexton et al. |
| 2010/0288558 A1 | 11/2010 | Sexton |
| 2011/0088955 A1 | 4/2011 | Cooley et al. |
| 2011/0174544 A1 | 7/2011 | Scott et al. |
| 2011/0289936 A1 | 12/2011 | Suciu et al. |
| 2012/0024107 A1 | 2/2012 | Sowul et al. |
| 2012/0037425 A1 | 2/2012 | Sexton et al. |
| 2012/0039551 A1 | 2/2012 | Cooley et al. |
| 2012/0048622 A1 | 3/2012 | Cooley et al. |
| 2012/0057814 A1 | 3/2012 | Dadson et al. |
| 2014/0037235 A1 | 2/2014 | Raby et al. |

OTHER PUBLICATIONS

Notice of Allowance in U.S. Appl. No. 13/826,941, mailed on Jan. 22, 2015, 5 pages (pp. 1-5 in pdf).

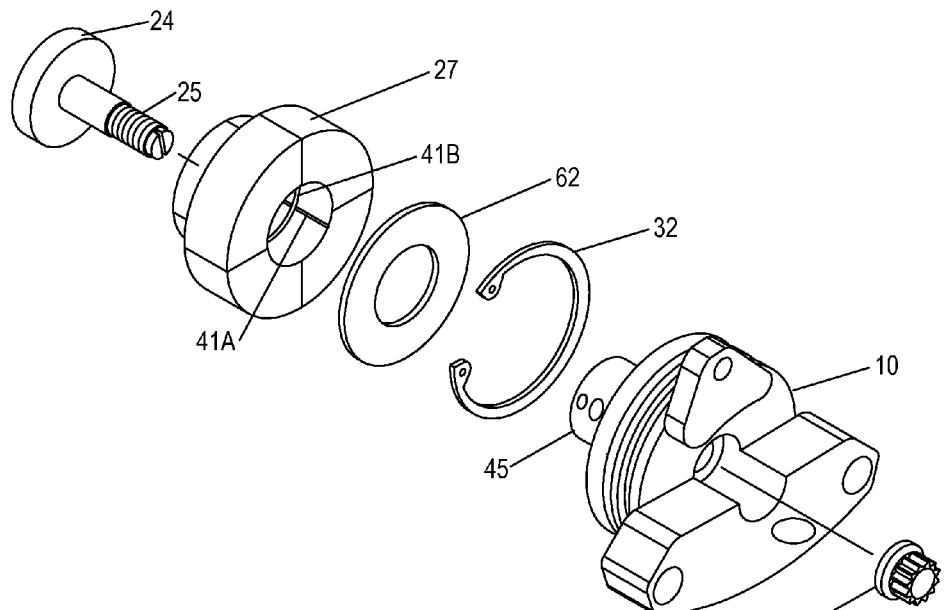
FIG. 5A
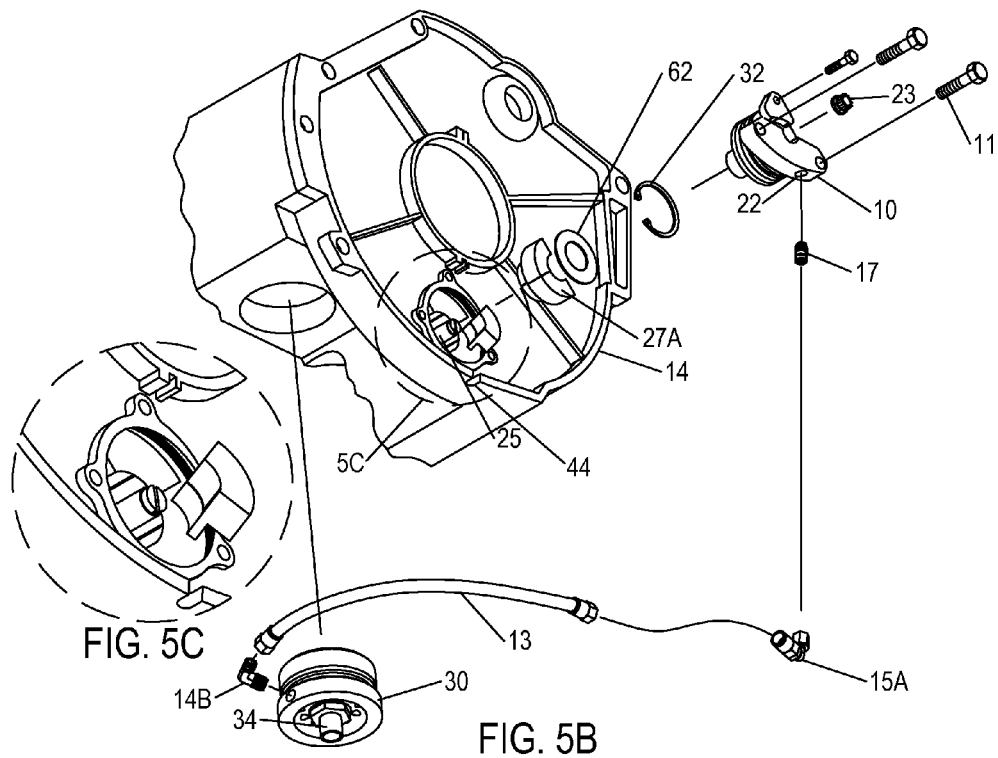
FIG. 5C
FIG. 5B

ENGINE BEARING LUBRICATION BY EXTERNAL POSITIVE OIL PRESSURE DELIVERY

This U.S. Patent Application is a Continuation of U.S. patent application Ser. No. 13/826,941 filed on Mar. 14, 2013, published as U.S. Patent Publication 20140037235 on Feb. 6, 2014, and claims priority thereto under 35 U.S.C. §120. U.S. patent application Ser. No. 13/826,941 claims priority under 35 U.S.C. §119 to U.S. Provisional Patent Application Ser. No. 61/677,511 filed on Jul. 31, 2012.

BACKGROUND OF THE INVENTION

1. Field of the Invention

The present invention relates generally to end bearings for machines, and more specifically, to a high-reliability bearing retrofit for supporting rotation of an internal combustion engine layshaft, also referred to as an intermediate shaft.

2. Description of the Related Art

Some horizontally-opposed engines are subject to bearing failure due to the use of a ball-bearing that supports the end of an intermediate layshaft used to couple the valve camshafts to the drive shaft. In one mode of failure, the ball bearing assembly fills with oil, causing failure of the lubrication retaining seals and the internal lubrication itself, releasing the balls from the ball bearings into the engine, causing catastrophic failure of the engine. Other modes of failure may also be present in such bearings.

Updates that have been implemented replace the original ball bearing with other ball-bearing types, but have limited lifetimes due to poor lubrication availability at the end of the intermediate layshaft, inherent issues with the bearings and bearing materials, and/or various operating conditions of the engine itself that tend to increase bearing wear both in idle and at high speeds.

Therefore, it would be desirable to provide an improved method and apparatus providing increased reliability and load carrying capability for rotating shaft end support bearings. It would be further desirable to provide an easily installed kit that can facilitate retrofit of engines subject to layshaft end-bearing failures with or without the engine being disassembled for the installation.

SUMMARY OF THE INVENTION

The objective of providing increased reliability bearing end support and increased load carrying capability is provided in a system including a lubrication delivery tube and a bearing having externally-supplied lubrication and its method of operation. A retrofit kit and installation method for retrofitting and/or repairing an engine by installing the bearing and lubrication system provides an effective upgrade or repair path for mechanics and engine builders. However, the techniques may also be used in an engine design.

The system includes an end bearing assembly having a flange mounted to an external surface of the engine cover and a bearing portion for supporting an end of the rotary shaft. The system also includes lubrication delivery system that provides lubrication to surfaces of the rotating bearing. Pressurized oil is delivered to the surfaces of the rotating bearing through a tube from another high-pressure oil source of the engine. A port in the flange may receive an external source of lubrication, which may be provided through a tube connected to another port on an external surface of the engine. The other port may be a port of an oil filter adapter that is inserted between an oil filter and an oil filter fitting of the engine, or another port or oil line that is available outside of or internal to the engine cover.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 5A is an exploded isometric view of a bearing assembly in accordance with another embodiment of the invention and FIG. 5B is an exploded isometric view of an engine bearing retrofit installation of the bearing assembly illustrated in FIG. 5A. FIG. 5C is an expanded view of callout 5C in FIG. 5B.

DESCRIPTION OF ILLUSTRATIVE EMBODIMENT

The present invention includes bearing assemblies that may be used in retrofitting and/or repairing engines subject to layshaft end-bearing failures, but having techniques that may also be used in new machine designs. In order to avoid the above-described failure mode of a ball-bearing assembly, the present invention incorporates externally-supplied lubrication provided to the bearing from an oil feed. Lubrication is provided through channels in the stud and mounting flange to the cap and bushing. The lubrication is provided to a port on an external surface of the mounting flange from a source of pressurized oil elsewhere in the engine, which may be from an oil filter adapter that taps lubrication from the oil filter attachment point.

Figure 1A:
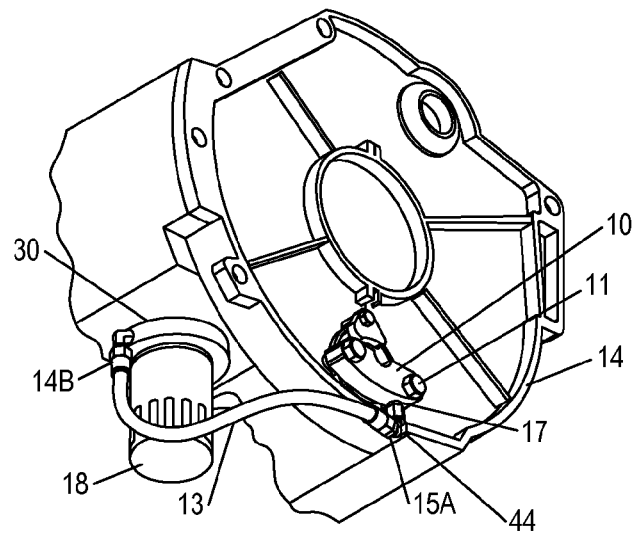
FIG. 1A is an isometric view and FIG. 1B is an exploded isometric view of an engine bearing retrofit installation in accordance with an embodiment of the invention.
Figure 1B:
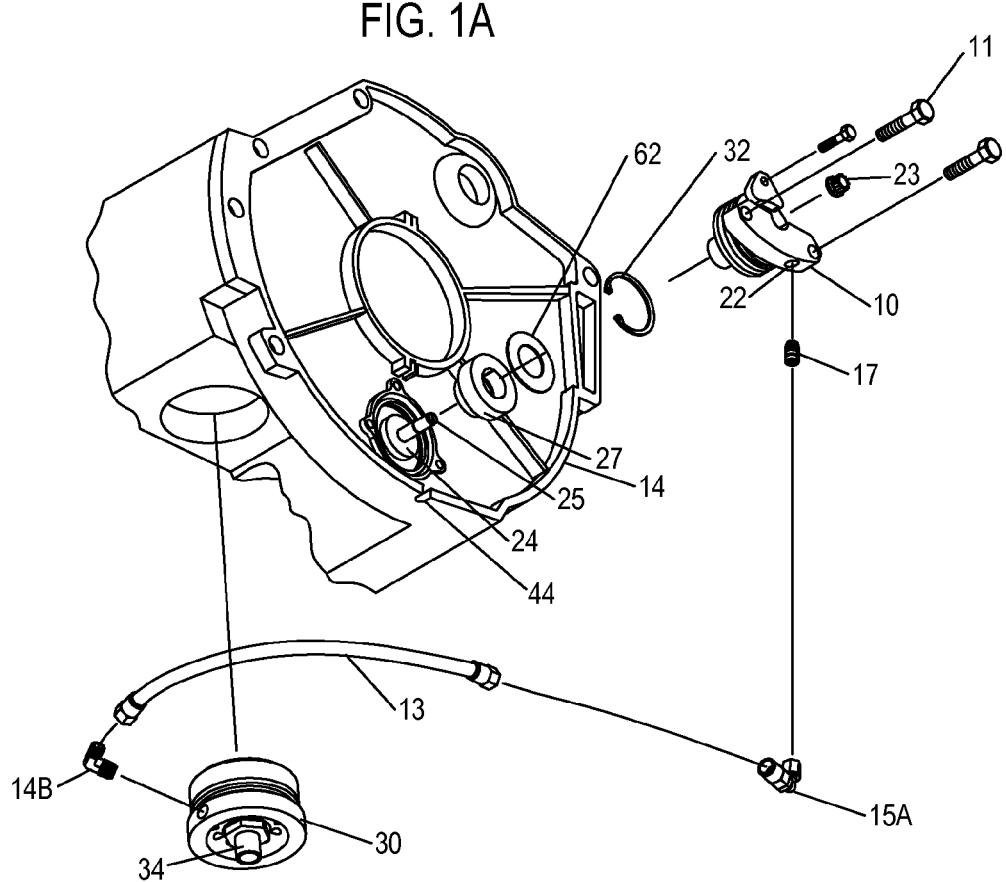

Referring to FIGS. 1A-1B, which are isometric views of an engine block having horizontally-opposed pistons, in which a retrofit or repair kit is installed or being installed, respectively, in accordance with an embodiment of the invention. A bearing assembly is installed to support the end of a layshaft, sometimes referred to as an intermediate shaft, at which a stock ball-bearing type roller bearing was previously installed, and is being replaced with a plain (journal) type bearing assembly in accordance with the present invention.

However, techniques according to the present invention may be applied in other circumstances and designs in which it is desirable to replace a roller bearing with a lubricated plain bearing, or other modifications requiring application of some or all of the techniques disclosed herein. The layshaft has a hollow sleeve end into which a bushing 27 of the bearing assembly is inserted and locked in place with a snap ring 32 that fits in a groove provided in the sleeve end of the layshaft. A cap 25 that has a threaded post portion 24 is first inserted in the sleeve end of the layshaft with the bushing 27 slid over cap 25, then both the bushing 27 and cap 25 are locked in place with snap ring 32. A plug may first be inserted in the sleeve end of the layshaft to prevent oil from entering the hollow portion of the layshaft beyond the plug and increasing the inertia of the layshaft. Then, after bushing 27 and cap 25 are locked in place, cap 25 is secured against bushing by tightening a nut 23 onto a portion of threaded post portion 24 that protrudes through a flange portion 10 of the bearing assembly once flange portion 10 is installed by inserting a stud portion 45 through bushing 27. Stud portion 45 and flange portion 10 are generally formed as one piece from the same material, but alternatively may be assembled from separate pieces and of different materials. A shim 62 is provided between bushing 27 and snap ring 32 to reduce wear, to allow for proper lubrication, and to further allow for adjustment of longitudinal play of the layshaft when the bearing assembly is installed. Three bolts 11 secure the flange portion 10 of the bearing assembly to the engine cover 14. In order to provide high reliability, bushing 27 is fabricated from a high strength wear-resistance aluminum alloy to reduce wear and flange portion 10 is fabricated from a steel alloy. While the design of the bearing is such that very high reliability is expected, the particular design also provides a fail-safe failure mode, in that stud portion 45

Figure 2A:
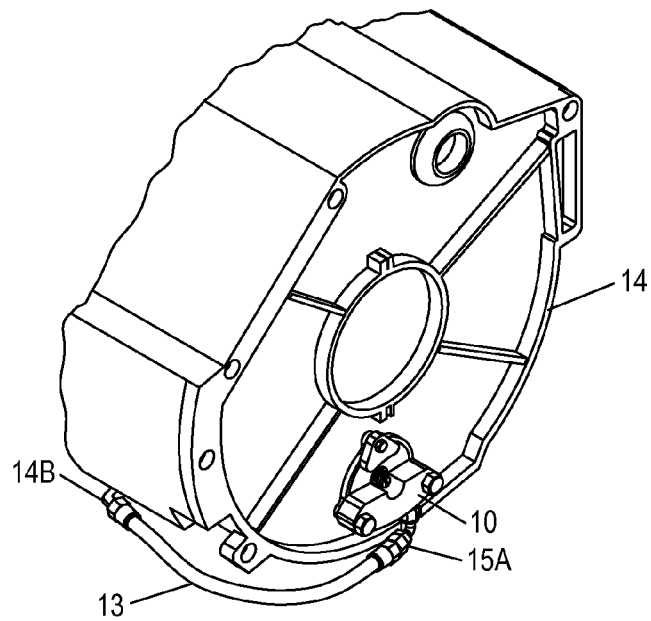
FIG. 2A is an isometric view and FIG. 2B is an exploded isometric view of the engine bearing retrofit installation of FIGS. 1A and 1B, shown from another angle.
Figure 2B:
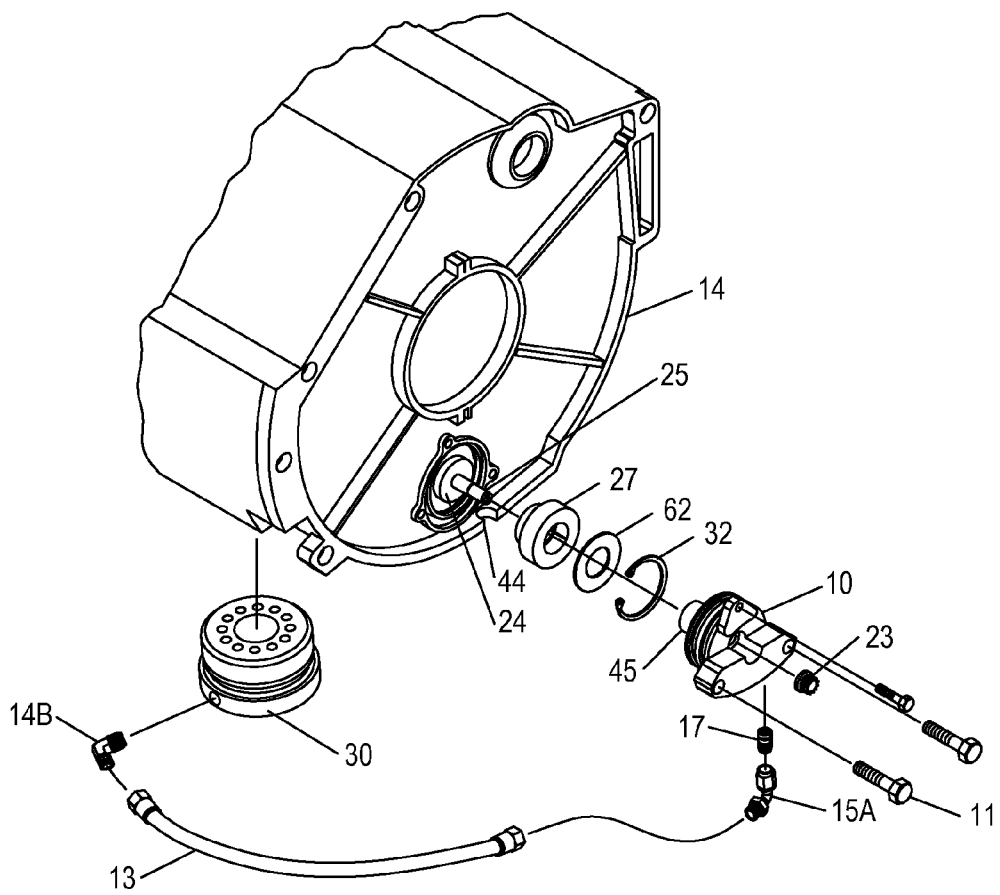

In order to lubricate the bearing assembly, since sufficient lubrication is not present within the region of the engine block in the vicinity of (and within) the end of the layshaft, a oil delivery tube 13 couples oil, with optional filtration, from another portion of the engine block at a high oil pressure point within the oil circulation system to a port 22 on the exterior of flange portion 10. Oil is conducted from port 22 through channels interior to flange portion 10 and to outlet holes on surfaces of stud portion 45. In the exemplary embodiment, an adapter 30 is included between oil filter 18 and the oil filter mounting location on engine cover 14. Adapter 30 has a port to which oil delivery tube 13 is coupled with an elbow 14B to receive high pressure oil and a threaded post-type oil filter mount 34. The other end of oil delivery tube 13 is coupled to a port on the flange portion 10 of the bearing assembly with a threaded pipe nipple 17 and an elbow 15A. A kit for retrofitting the engine block includes adapter 30, oil delivery tube 13 and the bearing assembly, and may optionally include an oil filter 18 of an improved performance for ensuring that oil delivered to the bearing assembly through port 22 is highly filtered to prevent any particulate from damaging bearing. An optional check-valve or oil accumulator may be included in-line with oil delivery tube 13 to maintain pressure at bearing assembly 10 when the engine is shut down, in order to provide lubrication at the moment of initial startup. The only modification required to install the kit on a typical engine is removal of a small segment 44 of the flywheel shroud of engine cover 14 near the bell house, in order to provide a path for routing oil delivery tube 13. The retrofit bearing kit shown in FIGS. 1A-1B has the advantage of high reliability over stock ball bearings, and over roller-type bearings in general, and further has a soft failure mode. The retrofit bearing kit is considered to have a soft failure mode since if the bearing assembly seizes, there are no balls, rollers or cages released into engine cover 14 and the bearing assembly will cause the layshaft to stop turning, thereby stopping rotation of the camshafts that control the valves which halts the engine, or if the bearing assembly breaks, the portion of the bearing assembly within the sleeve end of the layshaft can continue to rotate. The exemplary embodiment of the present invention has only three wear surfaces versus 11 wear surfaces and 8 rotating parts in the stock ball-bearing design. Referring now to FIGS. 2A-2B, the engine block of FIGS. 1A-1B is shown from another angle for clarity. Since there are no additional details or components in FIGS. 2A-2B, the description with reference to FIGS. 1A-1B applies equally to FIGS. 2A-2B.

Figure 3:
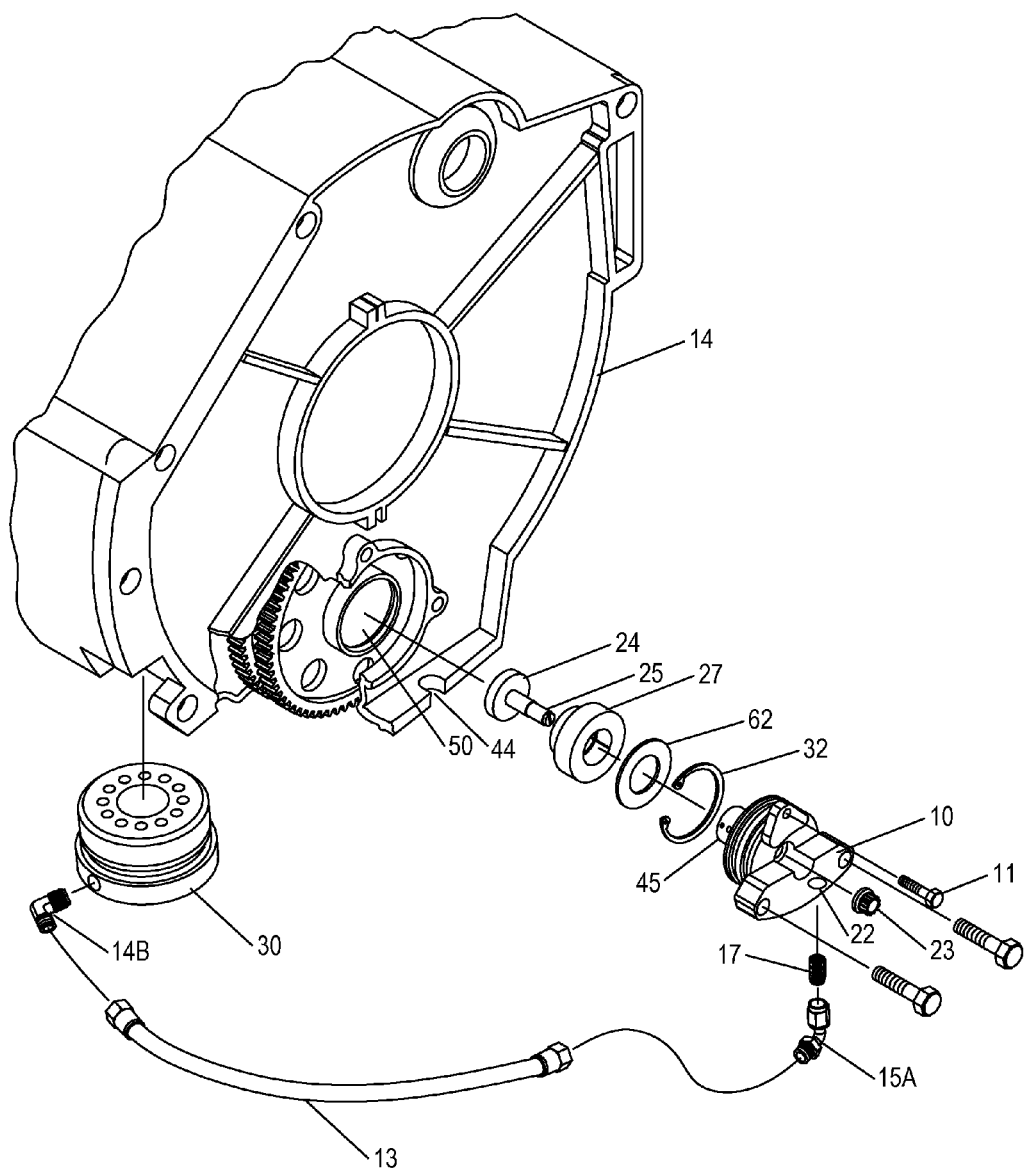
FIG. 3 is an exploded isometric view of the engine bearing retrofit installation of FIGS. 1A-1B and FIG. 2A-2B, showing further details.

Referring now to FIG. 3, further details of the engine block of FIGS. 1A-1B and FIGS. 2A-2B are shown. In FIG. 3, a cut-away of engine cover 14 is provided to show the sleeve end of layshaft 50 into which the cap 25, bushing 27 and shim 62 are installed and secured with snap ring 32. Flange portion 10 includes a cylindrical portion that seals the hole in engine cover 14 when installed and includes gasketing around the periphery where the cylindrical section of flange portion 10 contacts engine cover 14.

Bushing 27 of the bearing assembly provides a bearing surface that contacts the inner surface of cap 25, as well as the cylindrical inner bearing surface of bushing 27, which rides on a hydrodynamic film of oil between bushing 27 and the bearing portion 45 of flange portion 10. The end of bushing 27 opposite cap 25 also contacts a bearing surface provided on the inner face of flange portion 10 so that both end bearing surfaces provide longitudinal and radial support to bushing 27, and thus provide support against any longitudinal forces or radial forces caused by movement of or axial tension/compression of the layshaft. It is important that the proper amount of axial play be provided between flange portion 10 of bearing assembly, which is secured to engine cover 14, and bushing 27, which is secured within the sleeve end of the layshaft. The axial play between bushing 27 and flange portion 10 of bearing assembly controls axial movement of the layshaft, too much of which can lead to knocking and excessive timing chain/sprocket wear, and too little of which will cause some portion of the assembly to seize. Therefore shim 62 is provided to help control the movement of layshaft, in addition to reducing wear and providing for effective lubrication of the bearing.

Figure 4A:
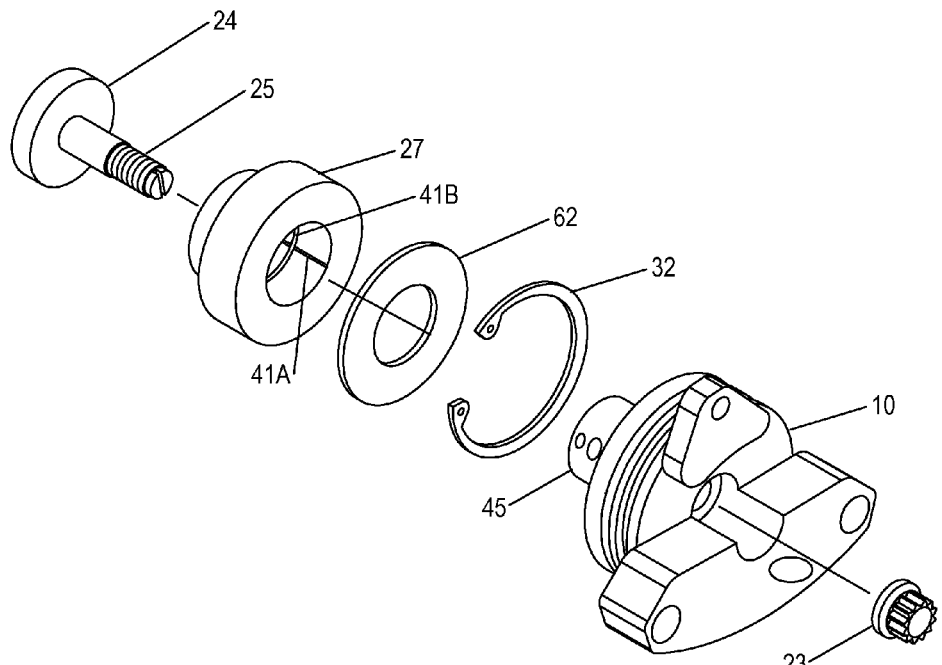
FIGS. 4A-4B are exploded isometric views of a bearing assembly of the retrofit bearing assembly included in FIG. 3, showing further details.
Figure 4B:
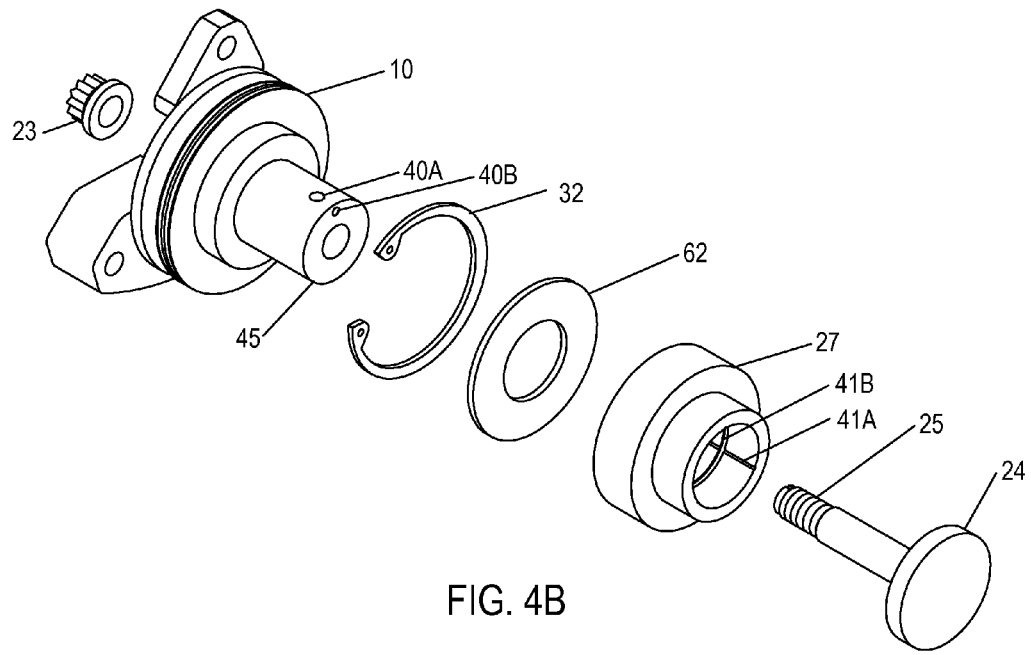

Referring now to FIGS. 4A-4B, further details of the bearing retrofit kit of FIGS. 1A-1B, FIGS. 2A-2B and FIG. 3 are shown. In FIGS. 4A-4B, which are isometric views from opposite ends of the bearing assembly, lubrication details, such as channels 41A and 41B are shown on the inside surface of bushing 27, which provide for conducting high pressure oil from a port 40A on the outer bearing face of bearing portion 45. Further, another port 40B provides lubrication between the inside face of cap 25 and the end of bushing 27.

Referring now to FIGS. 5A-5B, an alternative bearing retrofit kit is illustrated that is suitable for installation in an engine having different mechanical features from the engine described above. In the depicted engine, the hole in engine cover 14 has a smaller diameter than the inside diameter of the sleeve end of the layshaft. In order to install the bushing, a split bushing formed from bushings 27A is provided, that can be individually inserted in the end of the layshaft as illustrated in FIG. 5B. Since the layshaft can be moved while the bearing assembly is not installed, sufficient clearance is available to install the bushings 27A individually until all are installed. The remainder of the assembly is the same as for the engine as illustrated above in FIGS. 1-4B.

Figure 6A:
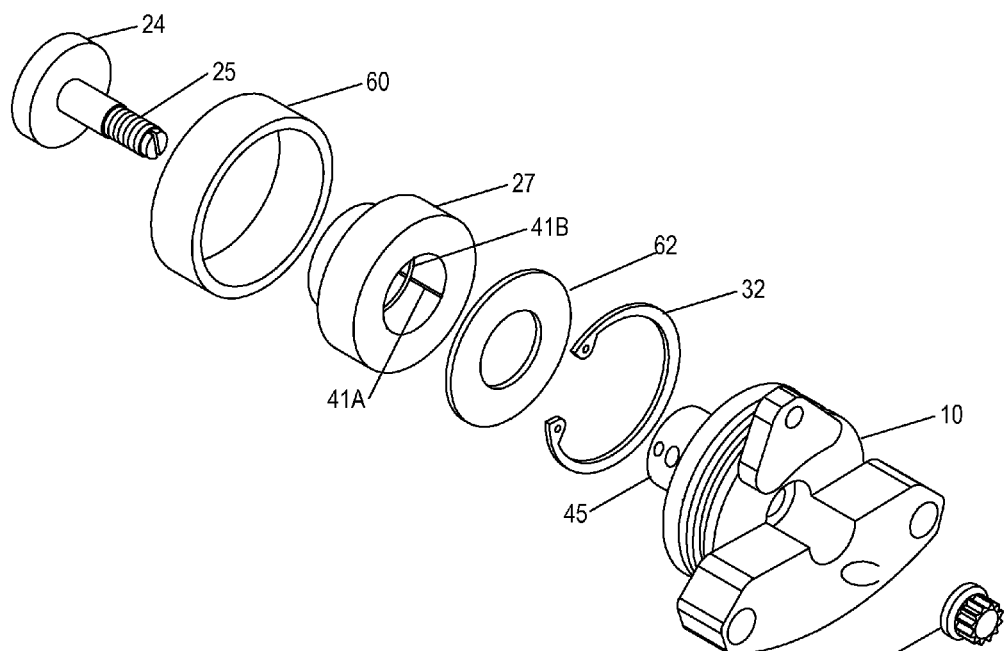
FIG. 6A is a exploded isometric view of a bearing assembly in accordance with yet another embodiment of the invention and FIG. 6B is an exploded isometric view of an engine bearing retrofit installation of the bearing assembly illustrated in FIG. 6A.
Figure 6B:
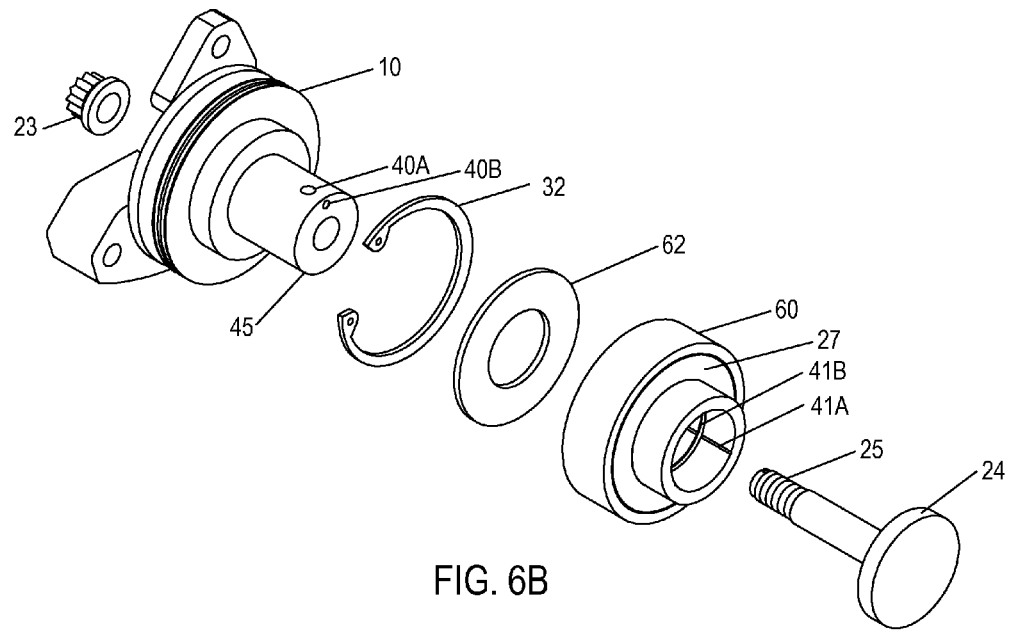

Referring now to FIGS. 6A-6B, another alternative bearing retrofit kit is illustrated that is suitable for installation in the engine described above with reference to FIGS. 5A-5B. In order to install the bushing of the alternate embodiment of FIGS. 6A-6B, engine cover 14 must be removed so that an assembly formed from bushing 27 and a press-fit adapter 60, that is attached to bushing 27, can be installed in the end of the layshaft, along with cap 25 and shim 62. Providing adapter 60 allows the same kit components to be used for retrofit kits applicable to any of the engines described herein, with the addition of adapter 60 being the only difference required for installation in the engine described with reference to FIGS. 5A-6B.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. An engine, comprising:
   an engine cover for covering internal components of the engine;
   a rotary shaft;
   an end bearing assembly having a flange mounted to an external surface of the engine cover and a bearing portion for supporting an end of the rotary shaft; and
   an oil delivery system comprising a tube coupled to a first port on the end bearing assembly for delivering pressurized oil to surfaces of the rotating bearing from a source of pressurized oil of the engine.

2. The engine of claim 1, wherein the engine further comprises:
   an oil filter fitting for attaching an oil filter;
   an adapter attached to the oil filter fitting, wherein the adapter has a second port for attachment of the tube of the oil delivery system; and
   an oil filter attached to the adapter, wherein a first end of the tube is connected to the first port and a second end of the tube connects to the second port of the adapter, whereby the adapter supplies the first port with the lubrication from oil supplied to the oil filter fitting of the engine while providing for filtering a remainder of the oil by the oil filter.

3. The engine of claim 2, wherein the adapter comprises:
   an adapter body adapted to attach to the oil filter fitting of the engine to receive pressurized oil therefrom at a face of the adapter body, the adapter body including the second port providing a source of the pressurized oil; and
   an oil filter mount for attaching the oil filter to the adapter body and coupled to the face of the adapter body wherein the oil filter mount is internally coupled to the face of the adapter body to receive pressurized oil from the engine.

4. The engine of claim 3, wherein the second port is configured to receive oil from the oil filter mount that is returning from the oil filter, whereby the oil supplied to the second port is filtered prior to exiting the port.

5. The engine of claim 1, wherein the oil delivery system supplies lubrication to the bearing portion of the end bearing assembly through a channel extending from the first port located on the flange to the bearing portion of the end bearing assembly.

6. The engine of claim 5, wherein the bearing portion of the end bearing assembly comprises:
   a bushing for coupling to an end of the rotary shaft; and
   a stud for insertion into the bushing and on which the bushing rotates.

7. The engine of claim 6, wherein the channel extends within the flange and through the stud to one or more holes on one or more external surfaces of the stud for providing lubrication between the one or more external surfaces of the stud and an inner surface of the bushing.

8. The engine of claim 1, wherein the rotary shaft is an intermediate layshaft of a horizontally-opposed engine.

9. A bearing installation kit, comprising:
   an end bearing assembly having a flange adapted for mounting to an external surface of an engine and a bearing portion adapted for supporting an end of a rotary shaft, wherein the flange has an oil port for delivering pressurized oil to the bearing portion; and
   an oil delivery tube having a first fitting for coupling to the oil port and a second fitting for coupling to a source of pressurized oil from the engine.

10. The bearing installation kit of claim 9, further comprising an adapter having a fitting adapted for attachment to an oil filter fitting of the engine, a port for attachment of the second fitting of the oil delivery tube, and an oil filter mount adapted for receiving an oil filter, whereby during operation, the adapter supplies the port with the lubrication from oil supplied to the oil filter fitting of the engine.

11. The bearing installation kit of claim 10, wherein the lubrication supplied to the port is directed to the oil filter mount for filtering by the oil filter prior to supplying the lubrication to the port.

12. The bearing installation kit of claim 9, wherein the bearing portion of the end bearing assembly comprises:
   a bushing for coupling to an end of the rotary shaft; and
   a stud for insertion into the bushing and on which the bushing rotates.

13. The bearing installation kit of claim 12, wherein the channel extends within the flange and through the stud to one or more holes on one or more external surfaces of the stud for providing lubrication between the one or more external surfaces of the stud and an inner surface of the bushing.

14. The bearing installation kit of claim 9, wherein the bearing portion of the end bearing assembly is adapted for supporting an end of an intermediate layshaft of a horizontally-opposed engine.

15. A method of supporting and lubricating an end of a rotary shaft of an engine, comprising:
   coupling an end of the rotary shaft to a bearing assembly comprising a bearing portion for coupling to the rotary shaft and a flange rotatably coupled to the bearing portion;
   securing the flange to an engine cover of the engine; and
   supplying lubrication to the bearing through a tube extending from a source of pressurized oil of the engine to an oil port on the flange.

16. The method of claim 15, wherein the supplying supplies lubrication to the bearing portion from a source external to the engine cover to the oil port on the flange, wherein the oil port is coupled to a channel extending through the flange to the bearing portion.

17. The method of claim 16, further comprising installing an adapter between an oil filter and an oil filter mount of the engine, wherein the adapter includes a port providing the source of pressurized oil, and wherein the tube is connected to the port at a first end thereof and the oil port of the flange at a second end thereof, whereby the adapter supplies the tube with the lubrication from oil supplied to the oil filter mount from the engine.

18. The method of claim 17, further comprising securing an oil filter to a second oil filter mount provided on the adapter, wherein the oil filter filters the source of pressurized oil before supplying the pressurized oil to the port.

* * * * *